April 20, 1937. J. N. STANLEY 2,077,777
OIL BURNER OVEN
Filed Jan. 27, 1936 2 Sheets-Sheet 1

Inventor
J. N. Stanley
By Mason + Porter
Attorneys

April 20, 1937.  J. N. STANLEY  2,077,777
OIL BURNER OVEN
Filed Jan. 27, 1936  2 Sheets-Sheet 2
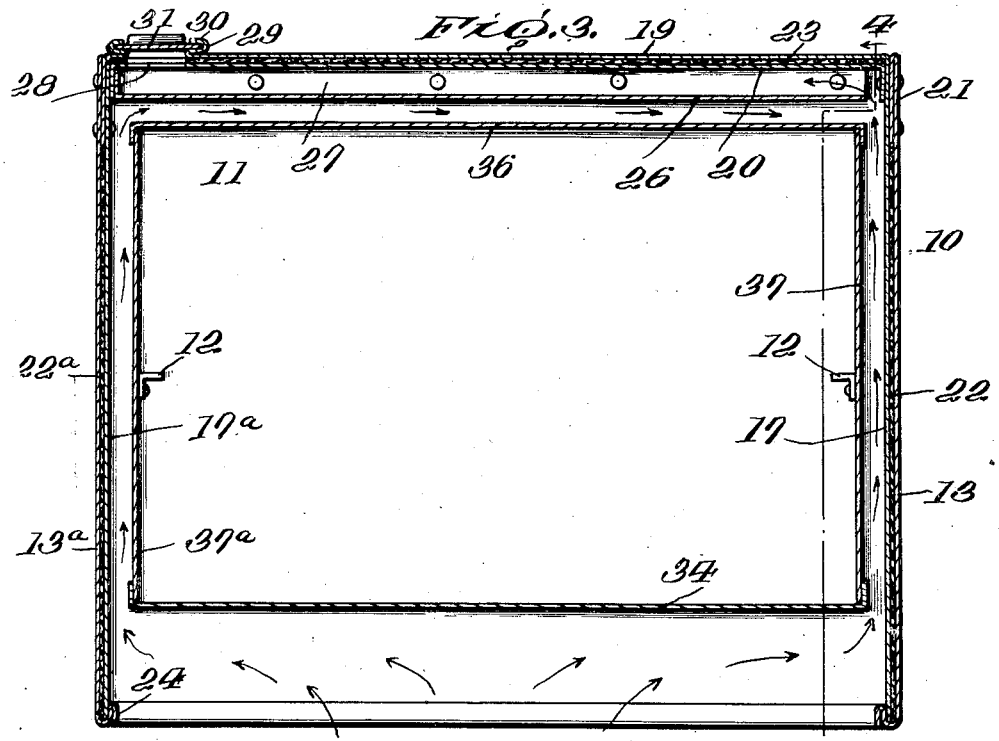
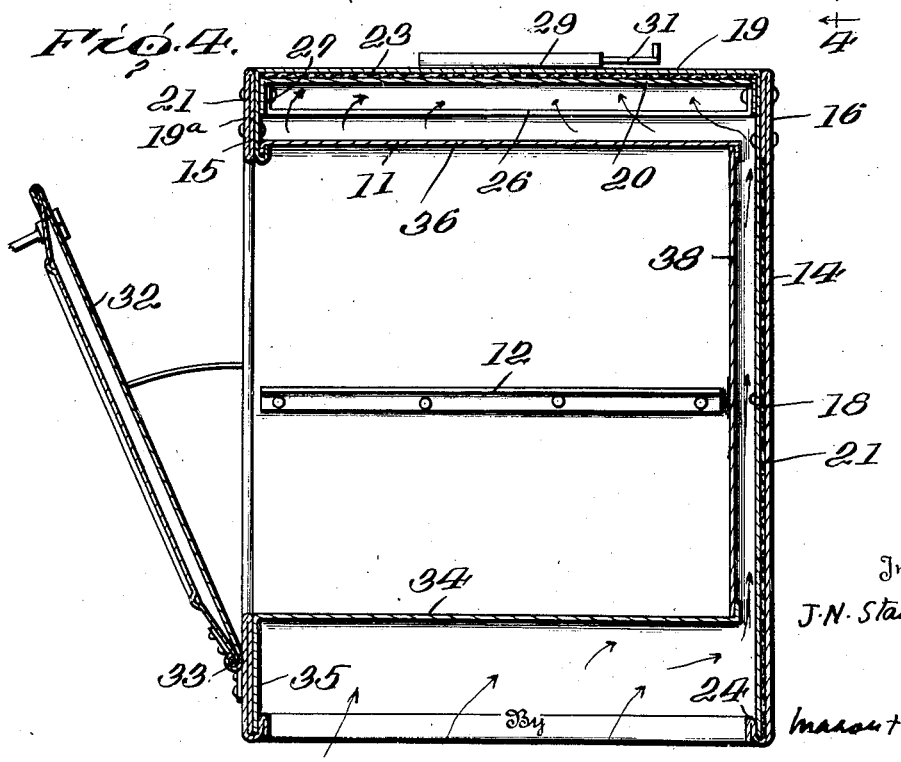
Inventor
J. N. Stanley
By Mason + Porter
Attorneys Patented Apr. 20, 1937

2,077,777

UNITED STATES PATENT OFFICE 2,077,777

OIL BURNER OVEN

James Noah Stanley, Graham, N. C.

Application January 27, 1936, Serial No. 61,069

2 Claims. (Cl. 126—275)

The present invention relates to new and useful improvements in ovens and more particularly to an improved portable oven adapted to be used with oil, gas or electric stoves.

An object of the invention is to provide an efficient and comparatively inexpensive portable oven wherein a uniform distribution of heat is effected and wherein a maximum heating effect is obtained from a minimum amount of fuel.

A further object of the invention is to provide an oven of the above type which is constructed of sheet metal and reinforced at vital points so as to increase the strength and rigidity thereof.

The above and other objects of the invention will in part be obvious and will be hereinafter more fully disclosed.

In the drawings:

Fig. 3 is a front view in section taken along the line 3—3 of Fig. 2.

Fig. 4 is a side view in section taken along the line 4—4 of Fig. 3.

Figure 1:
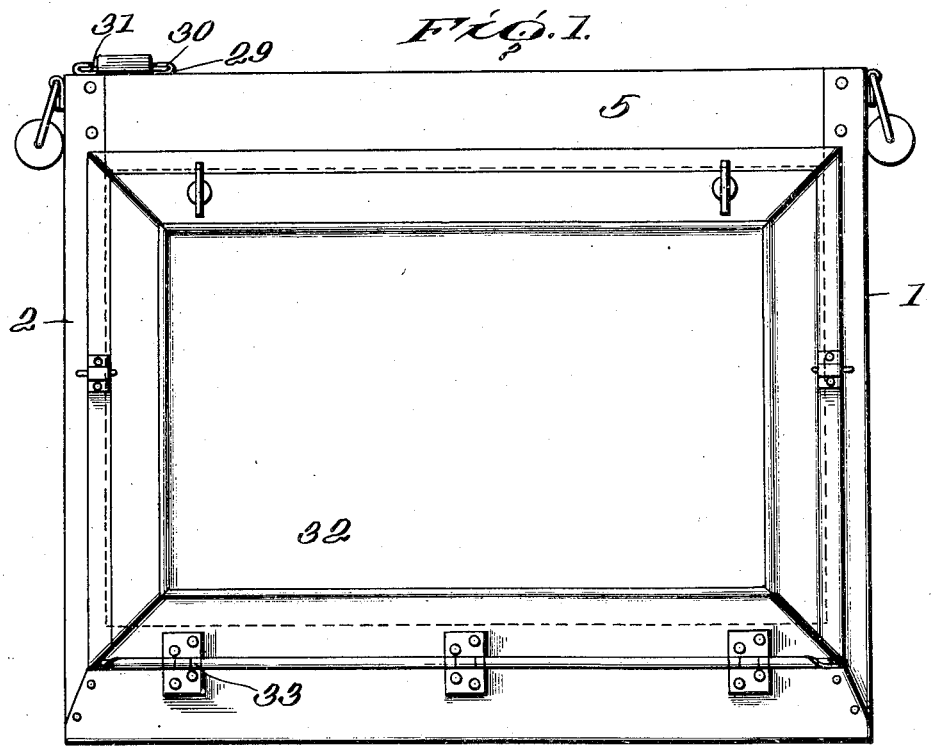
Fig. 1 is a front elevation of the oven.
Figure 2:
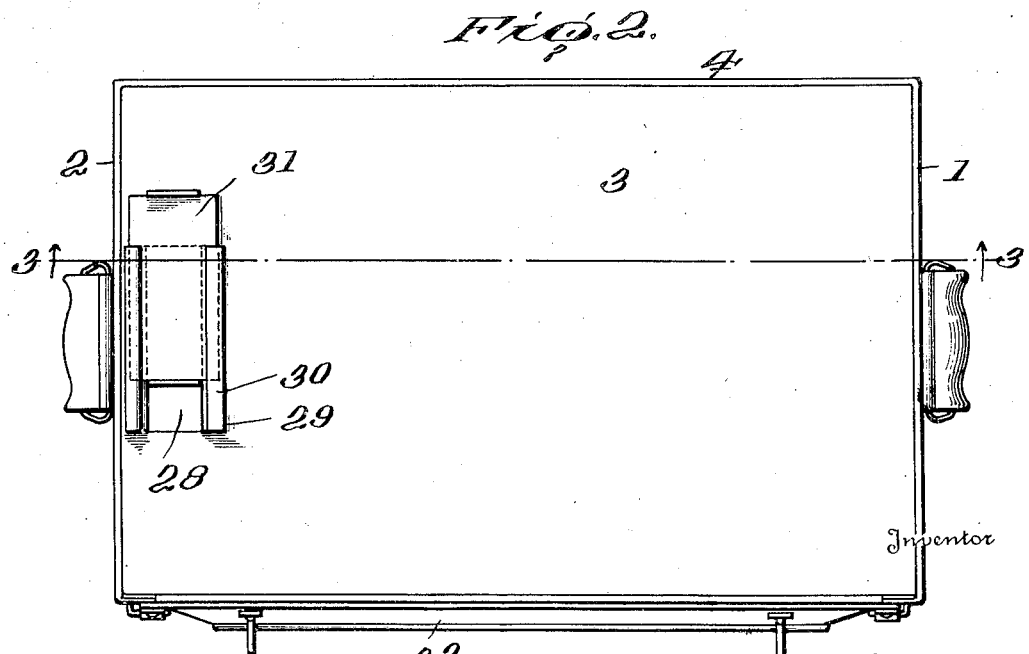
Fig. 2 is a top plan view of the same.

Referring to the accompanying drawings, the oven consists generally of an outer casing 10 and an inner casing 11 which forms the heating chamber. The chamber 11 may be provided with supports 12 for shelves or the like for supporting cooking utensils or other articles to be heated. The outer casing consists generally of side walls 1 and 2, a top wall 3, and a rear wall 4. The front wall portion 5 has a large opening which is closed by a hinged door 32.

The walls of the outer casing 10 are of a double thickness and include inner and outer metal sheets with asbestos or other insulating material disposed therebetween. The outer layer of the vertical walls of the outer casing 10 is formed from a single metal sheet shaped to form side portions 13, 13a, a back or rear portion 14, and a front portion 15. The upper edge portion of the metal sheet forming the vertical walls of the casing 10 are bent inwardly as at 16 to reinforce the same. The inner metal layer of the vertical walls of the casing 10 is also formed from a single sheet of metal which is properly cut and shaped to form side portions 17, 17a and a back or rear portion 18. This metal sheet forms the inner metal layer of the sides of the outer casing and also forms the outer layer 19 of the top of the casing 10. The inner layer of the top of the casing consists of a metal sheet 20 having depending edge portions 21 which are secured to the vertical walls and the rear wall of the outer casing by rivets or the like. Disposed between the rear metal wall portions 14, 18 is an asbestos sheet 21. Asbestos sheets 22, 22a are also disposed between the metal portions of the side walls 13, 13a respectively. Similarly, an asbestos sheet 23 is disposed between the metal portions 19 and 20 of the top of the outer casing 10. The lower edge of the metal sheet forming the outer layer of the vertical walls of the casing 10 is bent inwardly and upwardly to enclose the asbestos sheet and the inner metal layers and thence downwardly to reinforce the same, as at 24. Secured to the depending portions 21 of the metal sheet 20 at the top of the outer casing 10, is a metal baffle 26 having upstanding edge portions 27 secured by rivets and sealed to the front wall, rear wall, and side wall 2 of the outer casing 10. This baffle plate 26 extends across the casing 10 and has the opposite end thereof slightly spaced from the opposite side wall 1 of the casing 10. The metal sheets 19, 20 and the interposed asbestos sheet 23 forming the top of the outer casing 10 are cut to provide an opening 28 therethrough. The metal adjacent the opening in the outer layer 19 is suitably shaped to form parallel trackways 29 into which fit the edges 30 of a closure member 31 which constitutes a damper control for the oven.

The front wall of the outer casing is provided with a large opening which may be closed by a door 32 hinged at 33.

The inner casing 11 which forms the heating chamber, consists of a bottom wall 34 spaced from the bottom of the outer casing and having a depending portion 35 disposed between the front wall of the outer casing and the bent portion 24 thereof so as to afford a seal for preventing gases from the burners from escaping into the heating chamber 11. The top wall 36 of the casing 11 is spaced inwardly from the baffle plate 26 and has the edge thereof adjacent the door opening suitably secured to the depending portion 19a of the outer layer 19 of the outer casing in a manner which affords a seal at the top of the door opening to prevent gases from escaping into the heating chamber. The inner chamber 11 is also provided with side walls 37, 37a and a rear wall 38, all of which are suitably secured together and to the top and bottom walls. The rear wall of the inner casing 11 is spaced from the rear wall of the outer casing and the side walls of the inner casing are similarly spaced from the side walls of the outer casing.

When the portable oven is placed over a burner on a stove, the heated gases from the burner or burners will be directed against the bottom wall 34 of the inner casing 11 and upwardly between the side walls thereof and the side walls 1 and 2 of the outer casing and also between the rear walls 38 and 4 of the inner and outer casings respectively. The gases passing between the side wall 2 of the outer casing and the side wall 37a of the inner casing will be directed by the baffle plate 26 across the top 36 of the inner casing 11 and thence through the space between the free end of the baffle 26 and the side wall 1 of the outer casing to the space between the top wall 3 of the outer casing and the said baffle. These gases may then escape through the opening 28 which is controlled by the closure member 31. The gases passing between the side wall 1 of outer casing and the side wall 37 of the inner casing will be directed through the space between the free end of the baffle and the side wall 1 of the outer casing and thence along the spacing between the top wall 3 of the outer casing and the said baffle. The gases passing between the rear wall 4 of the outer casing and the rear wall 38 of the inner casing will be directed by the baffle plate 39 across the top 36 of the chamber 11 so as to supplement the heating afforded by the gases passing between the side walls 37a and 2 of the inner and outer casing respectively. These gases from the space between the rear walls of the casings will then flow toward the free end of the baffle 26 and then upwardly toward the opening 28 between the baffle 26 and the top wall 3 of the outer casing.

It will be noted that the casing 11 is uniformly heated on all sides thereof, first by the gases direct from the burners, then by the heated gases passing between the side and rear walls of the inner and outer casings, and finally by a plurality of layers of heated gases between the baffle 26 and the top wall 36 of the inner casing. Thus, it will be seen that when the oven is placed over a burner or burners, the gases will be directed uniformly on all sides of the heating chamber 11 and will be prevented from gaining access thereto. The side walls 37, 37a of the chamber 11, as well as the top and bottom walls 36, 34 thereof are sealed to the front 5 of the outer casing so as to prevent the gases from escaping into the heated compartment.

It will also be seen that the sheet metal construction of the oven with its various reinforcing features which have been pointed out, afford a rigid and durable structure which is heat insulated entirely around the same so that a maximum heating effect may be obtained from a minimum amount of fuel.

It is to be clearly understood that minor changes in the details of construction and the arrangement of parts may be made without departing from the scope of the invention as set forth in the appended claims.

I claim:

1. An oven comprising an outer casing having an opening in the front wall thereof, a door for closing said opening, said casing having an opening at the bottom thereof to receive heated gases and having a relatively small opening in the top wall thereof to permit the heated gases to escape, an inner casing disposed within the outer casing and having the front ends of the walls thereof bent to interfit and interlock with bent portions of the front wall of the outer casing whereby to provide a seal around the door opening to prevent heated gases from passing into the inner casing, and a baffle plate located in the space between the top of the inner casing and the top of the outer casing and having three edges thereof attached to the outer casing, the fourth edge of said baffle terminating short of the wall of the outer casing remote from the opening in the top wall thereof whereby the heated gases passing upwardly between the side and rear walls of the inner and outer casings are caused to pass across the top wall of the inner casing before passing above the baffle and escaping through the relatively small opening in the top wall of the outer casing.

2. A sheet metal oven comprising an outer casing having inner and outer sheet metal layers and an interposed asbestos layer, the inner layers of the front, side and rear walls of said casing and the outer layer of the top wall of said casing consisting of a single metal sheet, the inner layer of the top wall of said casing consisting of a metal sheet secured to the side walls of said casing, the outer layers of the front, side and rear walls of said casing consisting of a single metal sheet having the bottom edges thereof doubly bent inwardly against the inner layer of the side and rear walls of said casing whereby to strengthen the said walls; an inner casing disposed within the outer casing and spaced therefrom and forming with the front wall of said outer casing a seal for preventing the escape of gases into the said inner casing, said inner casing having the bottom wall thereof bent downwardly to extend between the front wall of said casing and the doubly bent bottom edge thereof and the top and side walls of said inner casing being interfitted with the inner layer of the front wall of said casing; and a baffle plate secured and sealed between the top walls of said inner and outer casings at three sides to the walls of said outer casing whereby to direct the heated gases across the top of said inner casing, and the free edge of said baffle plate being spaced from the fourth wall of said outer casing whereby to permit the ultimate escape of the heated gases.

JAMES NOAH STANLEY.